United States Patent
Matsumoto et al.

(10) Patent No.: US 12,517,156 B2
(45) Date of Patent: Jan. 6, 2026

(54) DIAGNOSTIC DEVICE FOR PARTICLE ACCELERATOR, DIAGNOSTIC METHOD FOR PARTICLE ACCELERATOR, AND DIAGNOSTIC PROGRAM FOR PARTICLE ACCELERATOR

(71) Applicant: TOSHIBA ENERGY SYSTEMS & SOLUTIONS CORPORATION, Kawasaki (JP)

(72) Inventors: Munemichi Matsumoto, Tokyo (JP); Katsushi Hanawa, Tokyo (JP); Kota Mizushima, Chiba (JP); Takuji Furukawa, Chiba (JP)

(73) Assignee: TOSHIBA ENERGY SYSTEMS & SOLUTIONS CORPORATION, Kawasaki (JP)

( * ) Notice: Subject to any disclaimer, the term of this patent is extended or adjusted under 35 U.S.C. 154(b) by 605 days.

(21) Appl. No.: 17/940,689

(22) Filed: Sep. 8, 2022

(65) Prior Publication Data
US 2023/0003772 A1    Jan. 5, 2023

Related U.S. Application Data

(63) Continuation of application No. PCT/JP2021/008142, filed on Mar. 3, 2021.

(30) Foreign Application Priority Data

Mar. 13, 2020    (JP)  ............... 2020-044630

(51) Int. Cl.
   *G01R 19/00*      (2006.01)
   *H05H 9/00*      (2006.01)

(52) U.S. Cl.
   CPC  ........... *G01R 19/0092* (2013.01); *H05H 9/00* (2013.01); *H05H 2240/00* (2013.01)

(58) Field of Classification Search
CPC ... G01R 19/0092; H05H 9/00; H05H 2240/00
See application file for complete search history.

(56) References Cited

U.S. PATENT DOCUMENTS

| | | | |
|---|---|---|---|
| 2009/0283702 A1* | 11/2009 | Umezawa | G21K 1/043 |
| | | | 250/492.3 |
| 2017/0330739 A1* | 11/2017 | Hosaka | H05H 9/00 |
| 2021/0128949 A1* | 5/2021 | Caldara | A61N 5/1067 |

FOREIGN PATENT DOCUMENTS

| | | | | |
|---|---|---|---|---|
| CN | 103083828 A | | 5/2013 | |
| EP | 2881142 A1 * | | 6/2015 | ........... A61N 5/1077 |

(Continued)

OTHER PUBLICATIONS

International Search Report and Written Opinion for PCT App. No. PCT/JP2021/008142, mailed May 11, 2021, with partial translation, 8 pages.

(Continued)

*Primary Examiner* — Michael J Dalbo
*Assistant Examiner* — Kaleria Knox
(74) *Attorney, Agent, or Firm* — Foley & Lardner LLP

(57) ABSTRACT

A particle-accelerator diagnostic technology capable of evaluating extraction efficiency of charged particles in a short cycle is provided.

A diagnostic device for a particle accelerator includes: a first receiver configured to receive a first detection signal from a first detector that detects a first current value generated by movement of charged particles in a circular accelerator, the first detection signal being outputted as a signal corresponding to the first current value; a second receiver configured to receive a second detection signal from a second detector that detects a second current value generated by movement of charged particles extracted from the circular accelerator into a beam transport system, the second detection signal being outputted as a signal corresponding to the second current (Continued)

value; and a calculator configured to calculate an extraction efficiency of charged particles based on the first and second detection signals.

8 Claims, 6 Drawing Sheets

(56) References Cited

FOREIGN PATENT DOCUMENTS

| | | | |
|---|---|---|---|
| JP | 2010-250116 A | 11/2010 | |
| JP | 4873563 B2 | * | 2/2012 |
| SG | 189670 A1 | 5/2013 | |
| TW | 1507227 B | 11/2015 | |
| WO | WO-2019/180069 A1 | 9/2019 | |

OTHER PUBLICATIONS

CN First Office Action for CN Appl. Ser. No. 202180020149.4 dated Apr. 25, 2025 (24 pages).

* cited by examiner

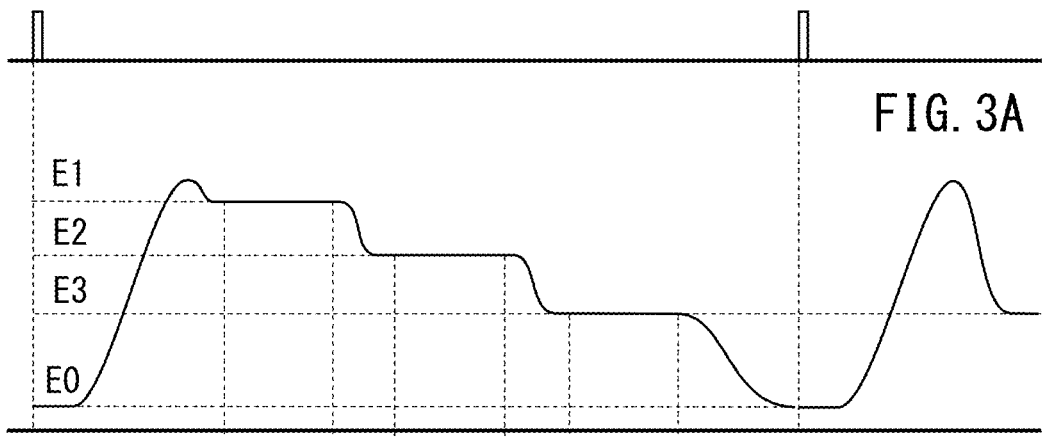
FIG. 3A
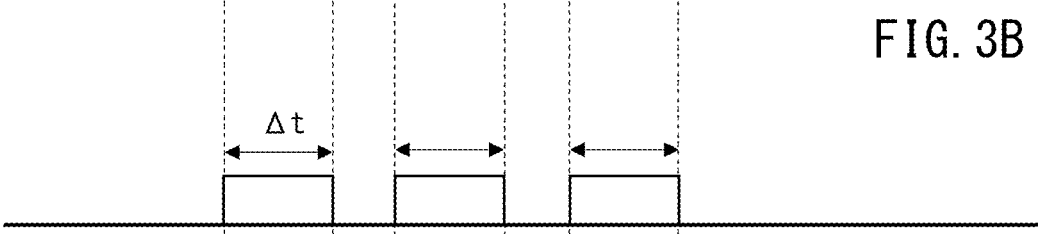
FIG. 3B
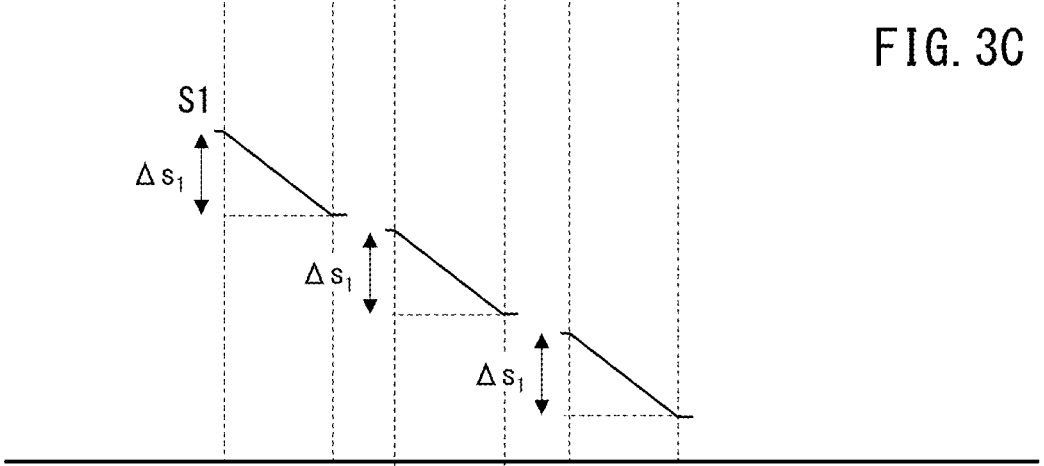
FIG. 3C
FIG. 3D
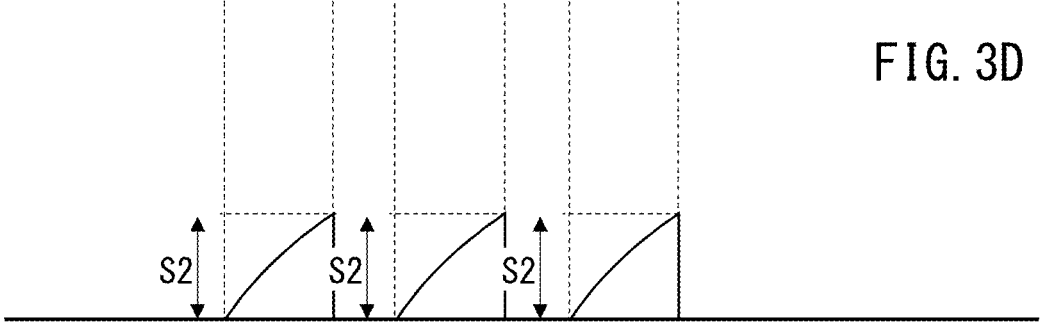
FIG. 3E

DIAGNOSTIC DEVICE FOR PARTICLE ACCELERATOR, DIAGNOSTIC METHOD FOR PARTICLE ACCELERATOR, AND DIAGNOSTIC PROGRAM FOR PARTICLE ACCELERATOR

CROSS-REAFFERENCE TO RELATED APPLICATIONS

This application is a Continuation Application of No. PCT/JP2021/008142, filed on Mar. 3, 2021, and the PCT application is based upon and claims the benefit of priority from Japanese Patent Application No. 2020-044630, filed on Mar. 13, 2020, the entire contents of which are incorporated herein by reference.

TECHNICAL FIELD

Embodiments of the present invention relate to a diagnostic technique for a particle accelerator that performs slow extraction of charged particle beams.

BACKGROUND

In recent years, research has been carried out to apply a charged particle beam, which are brought into a high-energy state by supplying charged particles (ions) to an accelerator and accelerating them, to a wide range of fields such as engineering and medicine. Currently, a widely used accelerator system is roughly composed of an ion source, a linear accelerator (i.e., linac), and a circular accelerator, and stepwisely accelerates charged particles in this order. When the charged particles orbiting in the circular accelerator reach a predetermined energy, an emission device is operated to extract the charged particle beam, traveling direction of which is changed from the orbit, into a beam transport system.

Specifications of emission devices that extract a charged particle beam from a circular accelerator are classified into "fast extraction" and "slow extraction". The "fast extraction" is a method of extracting all the groups (beams) of charged particles that orbit the circular accelerator within the time required for one orbit.

The "slow extraction" is a method of extracting a beam of charged particles little by little while causing the charged particles to orbit in the circular accelerator. Thus, as compared with the case of the "fast extraction", the charged particle beam to be obtained by the "slow extraction" can be gradually extracted from the circular accelerator over time. In this manner, the energy of the charged particle beam to be extracted into the beam transport system can be stepwisely changed by stepwisely accelerating the charged particle beam orbiting in the circular accelerator. Accordingly, in one acceleration cycle in the circular accelerator, charged particle beams of different energies (for example, hundreds of steps) can be extracted into the beam transport system.

PRIOR ART DOCUMENT

Patent Document

[Patent Document 1] Japanese Patent No. 4873563

SUMMARY

Problems to be Solved by Invention

Regarding the loss of the charged particle beam accelerated by the circular accelerator until reaching the terminal equipment (e.g., an irradiator in a treatment room) of the beam transport system, this loss is demanded to be as low as possible. If the transport loss of the charged particle beam is large, there is a problem that the planned energy pattern cannot be executed to the end. Further, if the transport loss of the charged particle beam is large, there is a problem that the beam utilization efficiency is lowered.

It is known that the extraction efficiency of such a charged particle beam changes depending on its energy value and can be improved by adjusting the exciting current of the electromagnet constituting the circular accelerator. In addition, the magnetic field of the electromagnet subtly changes with change in environment of the circular accelerator (cooling water temperature and room temperature), and thus, it is necessary to maintain a high extraction efficiency of charged particle beams by performing fine adjustment work.

It is considered that the extraction efficiency of the charged particle beam varies in the order of $10^{-5}$ seconds to $10^{-1}$ seconds. Thus, in order to maintain a high beam extraction efficiency, it is desirable to control the exciting current of the electromagnet while acquiring a beam extraction efficiency in a unit time as close to real time as possible.

In view of the above-described circumstances, an object of embodiments of the present invention is to provide particle-accelerator diagnostic technology that can evaluate an extraction efficiency of charged particles in a short cycle.

BRIEF DESCRIPTION OF DRAWINGS

FIG. 3A to FIG. 3E are timing charts illustrating the operation of the diagnostic device for a particle accelerator according to the embodiment.

DETAILED DESCRIPTION

First Embodiment

Figure 1:
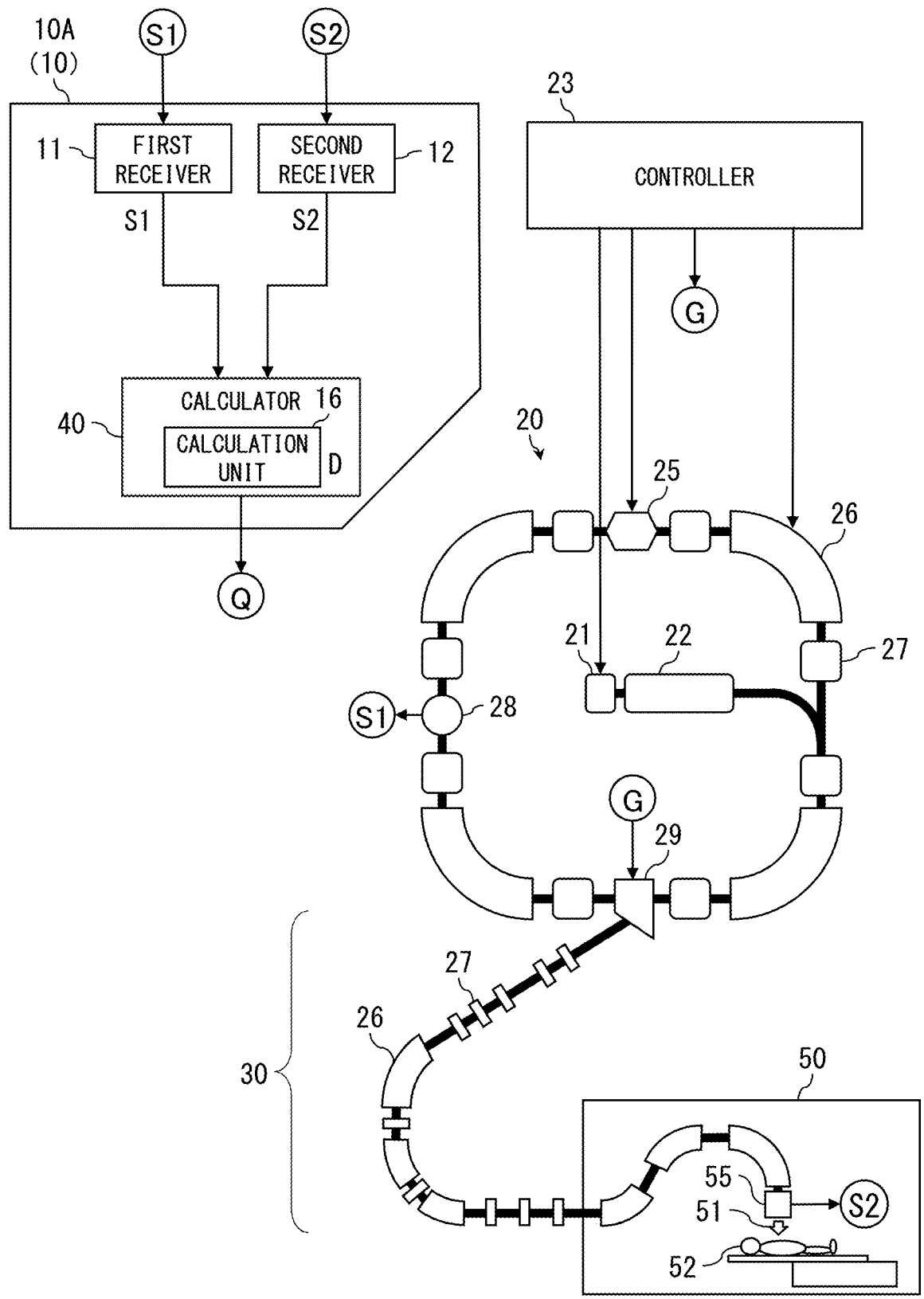
FIG. 1 is a block diagram of a diagnostic device for a particle accelerator according to the first embodiment of the present invention.

Hereinafter, embodiments of the present invention will be described by referring to the accompanying drawings. FIG. 1 is a block diagram of a diagnostic device 10A for a particle accelerator according to the first embodiment of the present invention.

The diagnostic device 10A (10) for a particle accelerator includes: a first receiver 11 configured to receive a first detection signal S1 from a first detector 28 that detects a first current value generated by movement of charged particles in a circular accelerator 20; a second receiver 12 configured to receive a second detection signal S2 from a second detector 55 that detects a second current value generated by movement of charged particles extracted from the circular accelerator 20 into a beam transport system 30; and a calculator 40 configured to calculate an extraction efficiency Q of charged particles on the basis of the first detection signal S1 and the second detection signals S2. Note that the first detection signal S1 is outputted as a signal corresponding to the first current value and the second detection signal S2 is outputted as a signal corresponding to the second current value.

The calculator 40 includes a calculation unit 16. The calculation unit 16 performs processing including differential processing on the first detection signal S1 so as to obtain a first processing signal D, and calculates the extraction efficiency Q of the extracted charged particles on the basis of the first processing signal D and the second detection signal S2 by calculating at least a ratio between them.

The system of the particle accelerator includes an ion source 21, a linac 22, and the circular accelerator 20, and stepwisely accelerates charged particles in this order. When the charged particles orbiting in the circular accelerator 20 reach a predetermined energy, an emitting device 29 is operated under the state where this energy is maintained, and the charged particle beam having been changed in traveling direction from the orbit is extracted into the beam transport system 30.

In this description, "energy" means "kinetic energy per nucleon". A target particle accelerator to be diagnosed by the diagnostic device 10A according to the present embodiment is an apparatus that includes at least the above-described linac (i.e., linear accelerator) 22, the circular accelerator 20, and the beam transport system 30.

Although aspects of the ion source 21 includes a laser-irradiation ion source in addition to a high-frequency (including microwave) irradiation ion source such as an ECR (Electron Cyclotron Resonance) ion source and a PIG (Penning Ionization Gauge) ion source, the ion source 21 is not limited to them.

The linac 22 arranges a plurality of accelerating electric fields with opposite electric field components next to each other into a straight line, repeatedly inverts the electric field direction at a high frequency, and always accelerates the charged particles passing through the accelerating electric field in only one direction. The linac 22 accelerates the ions having been made incident from the ion source 21 to a predetermined energy and then emits the ions to the circular accelerator 20.

The circular accelerator 20 includes: a high-frequency acceleration cavity 25 configured to accelerate the charged particles having been made incident from the linac 22 by high-frequency power; a plurality of bending electromagnets 26 configured to generate magnetic fields that bend the orbit of charged particles; a plurality of quadrupole electromagnets 27 configured to generate a magnetic field that diverges and converges the orbiting charged particles and holds them in the orbit; a current detector (i.e., first detector) 28 configured to detect the current value of the beam of orbiting charged particles; and the emission device 29 configured to emit a beam of charged particles orbiting in the circular accelerator 20 to the beam transport system 30 little by little.

The circular accelerator 20 of the above-described configuration can accelerate the beam of the charged particles made incident from the linac 22 at low energy to, finally, the upper limit energy which is 70% to 80% of the speed of light, while causing the beam to keep orbiting. The circular accelerator 20 can hold the energy of the beam of orbiting charged particles at any energy lower than this upper limit energy. A controller 23 controls the ion source 21, the linac 22 and the circular accelerator 20 in conjunction with each other such that the beam of the charged particles is accelerated correctly.

The beam transport system 30 includes: quadrupole electromagnets 27 for keeping the charged particles traveling straight in the orbit; and bending electromagnets 26 for bending the orbit of the charged particles, separately from the electromagnets 26 and 27 in the circular accelerator 20. An irradiator 50 configured to irradiate a tumor of a patient 52 with the charged particle beam 51 as treatment is connected to the output stage of this beam transport system 30. The irradiator 50 is only one aspect, and the facility to be connected to the output stage of the beam transport system 30 is not particularly limited.

The specification of the emission device 29 adopted in the embodiment is the "slow extraction" in which a group (beam) of charged particles orbiting in the circular accelerator 20 is gradually extracted. The emission device 29 excites an emission electrode (not shown) on the basis of a control signal G inputted from the controller 23 so as to extract the beam transitioned to an unstable region from the circular accelerator 20 into the beam transport system 30. The beam transport system 30 is provided with a second detector 55 that detects and monitors the current value (i.e., second current value) generated by the movement of charged particles passing through it.

The first detection signal S1 to be received by the first receiver 11 is a signal to be outputted from the first detector 28 provided in the circular accelerator 20 and corresponds to the current value (i.e., first current value) generated by the movement of orbiting charged particles. The principle of measuring the current value by the first detector 28 is to detect the magnetic field formed concentrically around the electric current by using Ampere's law. The first detector 28 outputs the first detection signal S1 that is proportional to the first current value generated by the movement of orbiting charged particles.

The calculation unit 16 outputs the first processing signal D that is obtained by performing processing including at least temporal differentiation on the first detection signal S1. When the beam is extracted from the circular accelerator 20 into the beam transport system 30 without loss, the first processing signal D corresponds to the ideal value of the second detection signal S2 to be detected by the second detector 55.

The first detection signal S1 representing the orbital current value of the circular accelerator 20 is proportional to the orbital frequency f of charged particles, and this orbital frequency f is proportional to the velocity of the charged particles. The decrease number A of charged particles orbiting in the circular accelerator 20 per unit time is represented by Expression 1 and corresponds to the first processing signal D. In Expression 1, the coefficient k is an amount to be determined depending on the nuclide of charged particles and is a coefficient for conversion from charge amount into number of particles. The $\Delta S1$ is the amount of change in the first detection signal S1 in the period $\Delta t$.

decrease number of orbiting charged particles per unit time $A=D\times K1$ $$[D=\Delta S1/\Delta t, K1=k/f]$$  Expression 1

Although it is not shown, a noise filter configured to remove a noise component contained in the first detection signal S1 is provided at the input stage of the processing in which the first detection signal S1 is time-differentiated by the calculation unit 16. An amplifier (not shown) configured to amplify the first detection signal S1, which is an analog signal, is also provided at the input stage of the above-described noise filter. Although the amplified first detection signal S1 is processed by the noise filter and calculation unit 16 as an analog signal after that in some cases, the amplified first detection signal is converted into a digital signal and then is processed by the noise filter and the calculation unit 16 in some cases.

The second detection signal S2 to be received by the second receiver 12 is a signal to be outputted from the second detector 55 which is provided in the beam transport system 30, and is a signal corresponding to the current value (i.e., second current value) generated by the movement of charged particles traveling straight. The principle of measuring the current value by the second detector 55 is to count the pulse signals generated by the ionized electrons when the charged particle beam passes through the gas. The number of counts of the pulse signals per unit time corresponds to the current value generated by the movement of charged particles passing through the beam transport system 30.

The second detector 55 generates a pulse signal having a frequency which is proportional to the current value of the passing charged particles, and outputs the count integrated value of the generated pulse signal per unit time as the second detection signal S2. As shown by Expression 2 below, the passing number B of charged particles traveling straight through the beam transport system 30 per unit time is obtained by multiplying the second detection signal S2 and the second coefficient K2, which represents the number of charged particles per pulse.

Expression 2 passing number of charged particles traveling straight per unit time B=S2×K2

The calculator 40 calculates the extraction efficiency Q of the charged particles by using Expression 3 below. Thus, the extraction efficiency Q has the ratio (S2/D) between the second detection signal S2 and the first processing signal D as an element. Further, the extraction efficiency Q when the energy of the charged particles changes is obtained by multiplying the ratio (S2/D) between the second detection signal S2 and the first processing signal D by the orbital frequency f and the constant (K2/k).

extraction efficiency $Q=B/A=K3 \times S2/D$ $[K3=K2/K1=f \cdot K2/k]$  Expression 3

Although the extraction efficiency Q of the beam fluctuates due to various factors, the extraction efficiency Q can be recovered by adjusting the magnetic field based on adjustment of the current value of the electromagnets that constitute the circular accelerator 20 and the beam transport system 30. In particular, it can often be improved by adjusting the current pattern(s) of the quadrupole electromagnets 27 configured to converge the charged particle beam that orbits in the circular accelerator 20.

Second Embodiment

Figure 2:
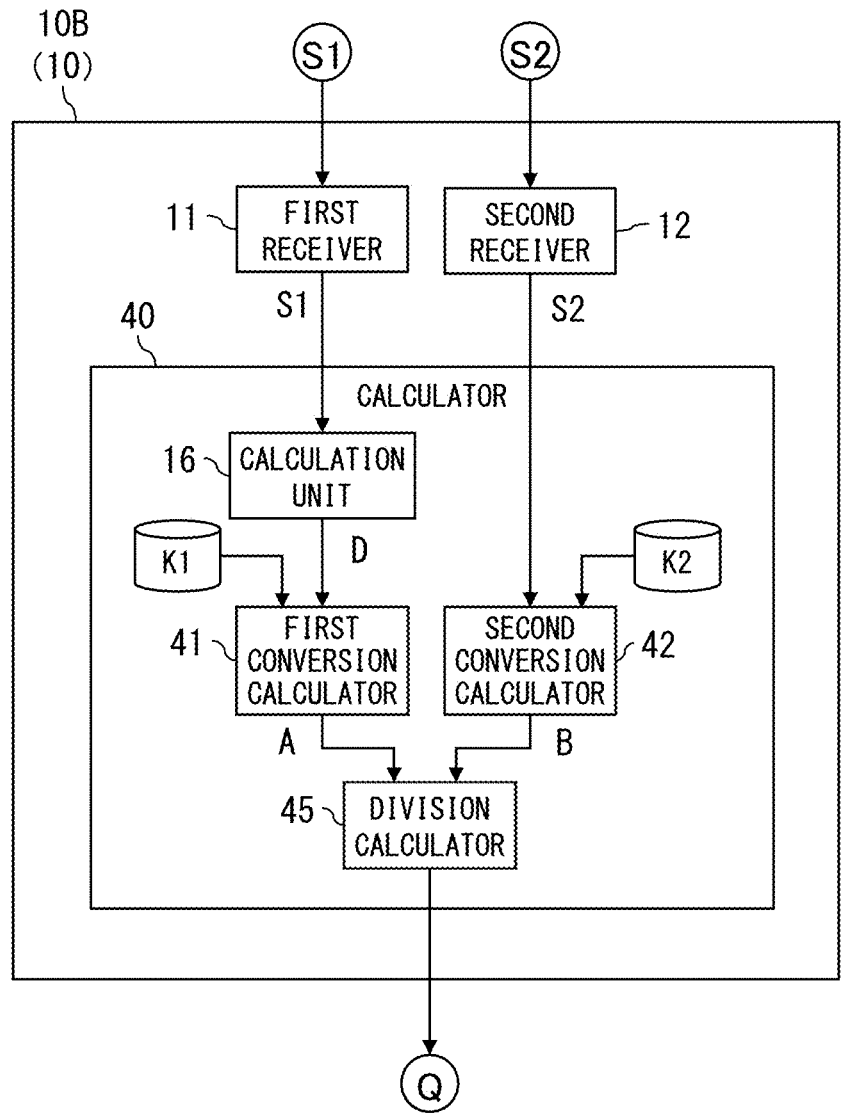
FIG. 2 is a block diagram of a diagnostic device for a particle accelerator according to the second embodiment of the present invention.

Next, the second embodiment of the present invention will be described by referring to FIG. 2. FIG. 2 is a block diagram of a diagnostic device 10B for a particle accelerator according to the second embodiment of the present invention. In FIG. 2, each component having the same configuration or function as those in FIG. 1 is denoted by the same reference sign, and duplicate description is omitted.

The calculator 40 of the diagnostic device 10B (10) for a particle accelerator according to the second embodiment includes: a first conversion calculator 41 configured to multiply the first processing signal D by the first coefficient K1 and to convert it into a first conversion value A, which represents the decrease number of charged particles orbiting in the circular accelerator 20 per unit time; and a second conversion calculator 42 configured to multiply the second detection signal S2 by the second coefficient K2 and to convert it into a second conversion value B, which represents the passing number of charged particles travelling straight through the beam transport system 30 per unit time. A division calculator 45 calculates the extraction efficiency Q by dividing the second conversion value B by the first conversion value A.

As shown in Expression 1, the first conversion value A to be outputted from the first conversion calculator 41 is obtained by multiplying the first processing signal D inputted from the calculation unit 16 by the first coefficient K1. Since the first coefficient K1 includes the orbital frequency f of the circular accelerator 20 in its element, when the energy of the orbiting charged particles changes, the first coefficient K1 is also changed depending on this change in energy.

As shown in Expression 2, the second conversion value B to be outputted from the second conversion calculator 42 is a value obtained by multiplying the second detection signal S2 and the second coefficient K2. This second conversion value B represents the passing number of charged particles traveling straight through the beam transport system 30 per unit time, and the first conversion value A represents the decrease number of charged particles orbiting in the circular accelerator 20 per unit time. Thus, even when the energy of the charged particles orbiting in the circular accelerator 20 changes stepwisely, the ratio (B/A) between the second conversion value B and the first conversion value A represents the extraction efficiency Q.

FIG. 3A to FIG. 3E are timing charts illustrating the operation of the diagnostic device for a particle accelerator according to the embodiment. A command signal is transmitted from the controller 23 (FIG. 1) to the ion source 21 at the timing shown in FIG. 3A. Subsequently, the charged particles are outputted from the ion source 21 and accelerated by the linac 22, and then the beam of the charged particles is supplied to the circular accelerator 20.

FIG. 3B shows a profile of the exciting current to be applied to the bending electromagnets 26 from controller 23 (FIG. 1). Since the exciting current of each bending electromagnet 26 is a value uniquely determined so as to correspond to the energy of the orbiting charged particle, it may be considered that FIG. 3B shows the profile of the energy of the charged particles orbiting in the circular accelerator 20.

Before the transmission of the command signal (FIG. 3A), the circular accelerator 20 is set to an initial state that is appropriate for orbiting the charged particles having an incident energy $E_0$ immediately after being supplied from the linac 22. After the beam of the charged particles is made incident, the circular accelerator 20 changes the setting state in the direction of increasing the energy of the charged particles, and holds the setting state when the energy becomes stable at the predetermined energy $E_1$.

FIG. 3C shows the period Δt of the control signal G to be transmitted from the controller 23 (FIG. 1) to the emission device 29 under the state where the setting state of the circular accelerator 20 is held at the energy $E_1$ ($E_2$, or $E_3$). In this manner, during the period Δt in which the control signal G is transmitted to the emission device 29, the beams of the charged particles orbiting in the circular accelerator 20 are gradually extracted into the beam transport system 30.

FIG. 3D shows the profile of the first detection signal S1 that indicates the current value of the beam of the charged particles orbiting in the circular accelerator 20 in the first detector 28 (FIG. 1). The calculation unit 16 performs temporal differentiation to output the change amount ΔS1 of the first detection signal S1 in the period Δt, and outputs the first processing signal D.

FIG. 3E shows the profile of the second detection signal S2 that indicates the count integration value of the pulse signal(s) generated by the charged particles traveling straight through the beam transport system 30 during the period Δt in the second detector 55 (FIG. 1). At the timing when the first processing signal D and the second detection signal S2 are obtained, the extraction efficiency Q is calculated by Expression 3. Further, under the state where the setting state of the energy E of the circular accelerator 20 stepwisely changed from $E_1$ to $E_2$ and to $E_3$, the first processing signal D and the second detection signal S2 are acquired, and the extraction efficiency Q is calculated by Expression 3 in which the orbital frequency f corresponding to the energy E is substituted.

Although the period of differentiation and integration is matched to the beam extraction period Δt in the beam transport system 30 for facilitating understanding in FIG. 3A to FIG. 3E, the period of differentiation and integration may be a further shorter period Δt (for example, 100 ms, 10 ms, or 1 ms) within the beam extraction period.

As the control signal G is transmitted to the emission device 29 and time elapses, the beam of charged particles orbiting in the circular accelerator 20 decreases or disappears. Thus, the setting state of the circular accelerator 20 is returned (i.e., decelerated) from the state of energy $E_1$, $E_2$, $E_3$ to the state (i.e., initial setting) of the incident energy $E_0$, the command signal is transmitted to the ion source 21 again (FIG. 3A), and thereby, the extraction efficiency Q can be recalculated.

Third Embodiment

Figure 4:
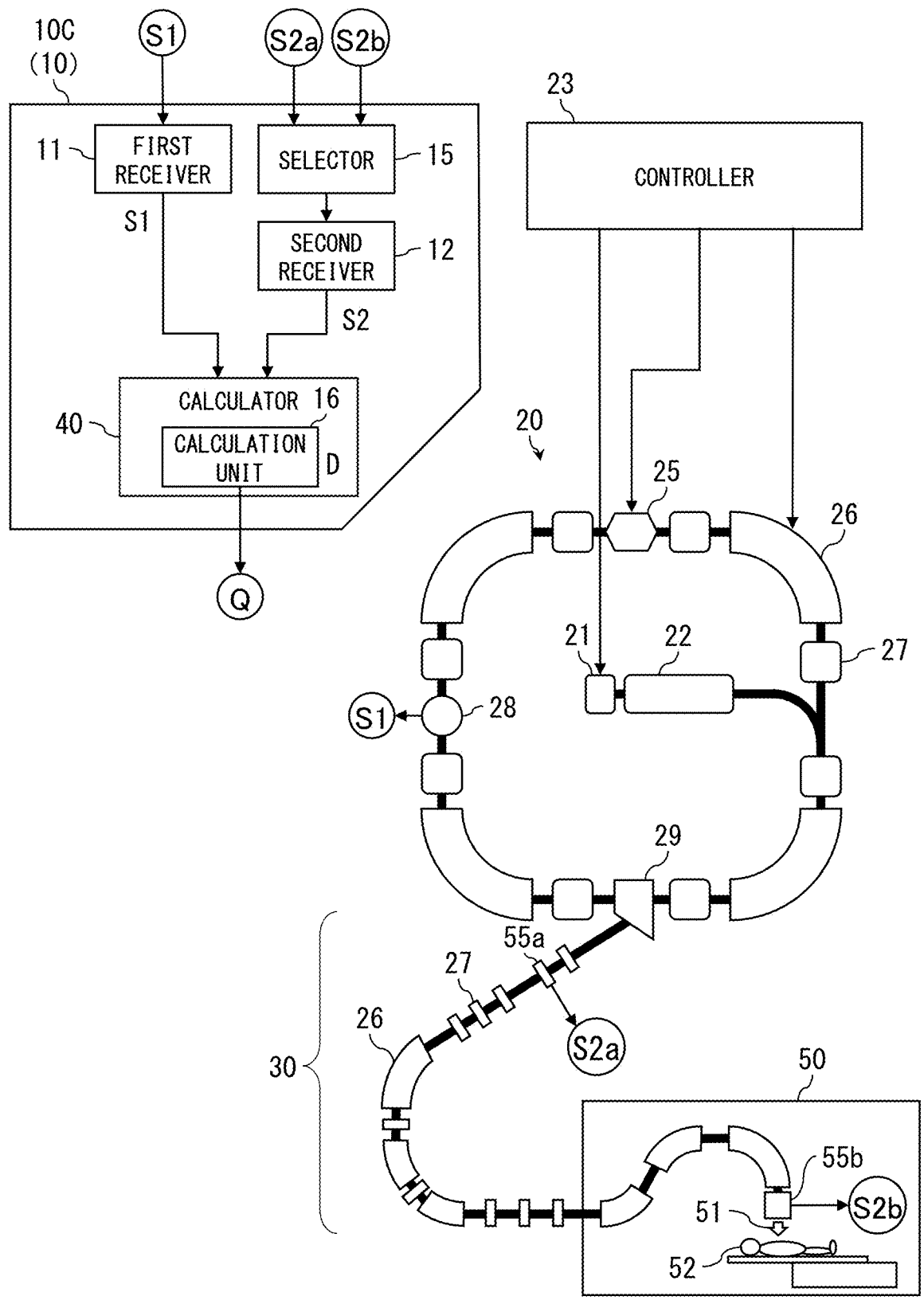
FIG. 4 is a block diagram of a diagnostic device for a particle accelerator according to the third embodiment of the present invention.

Next, the third embodiment of the present invention will be described by referring to FIG. 4. FIG. 4 is a block diagram of a diagnostic device 10C for a particle accelerator according to the third embodiment of the present invention. In FIG. 4, each component having the same configuration or function as those in FIG. 1 is denoted by the same reference sign, and duplicate description is omitted.

The diagnostic device 10C for a particle accelerator according to the third embodiment includes a selector 15 that selects one of the plurality of second detection signals S2 (S2*a*, S2*b*) received from the respective second detectors 55 (55*a*, 55*b*) provided in the beam transport system 30. The second detection signal S2 selected by the selector 15 is received by the second receiver 12. The operation of the respective components of the third embodiment except the selector 15 is the same as the components of the first embodiment and the second embodiment.

The second detection signal S2*a* is outputted from the second detector 55*a* installed on the upstream side of the beam transport system 30, and thus, the extraction efficiency Q calculated on the basis of the second detection signal S2*a* reflects the beam loss immediately after being extracted from the circular accelerator 20 into the beam transport system 30. The second detection signal S2*b* is outputted from the second detector 55*b* installed on the downstream side of the beam transport system 30, and the extraction efficiency Q calculated on the basis of the second detection signal S2*b* also reflects the beam loss in the process of passing through the beam transport system 30.

One of the factors of the deterioration of extraction efficiency Q is that the electromagnet magnetic-field subtly changes due to change in environment such as the cooling water temperature and room temperature in the accelerator building. When the extraction efficiency Q calculated on the basis of the second detection signal S2*a* deteriorates, the peripheral devices of the circular accelerator 20 and the control parameters are adjusted. When the extraction efficiency Q calculated on the basis of the second detection signal S2*b* deteriorates, the peripheral devices of the beam transport system 30 and the control parameters are adjusted. In this manner, a plurality of extraction efficiencies Q are calculated on the basis of the second detection signals S2 outputted from the respective second detectors 55 provided at different positions in the beam transport system 30, which helps to determine the cause of the beam loss.

Although the above-described embodiment shows the case where the beam transport system 30 is configured of one line, the beam transport system 30 is configured of branched lines in some cases. In such a case, disposition of the plurality of second detectors 55 facilitates the identification of which branch of the beam transport system 30 is responsible for the beam loss.

Fourth Embodiment

Figure 5:
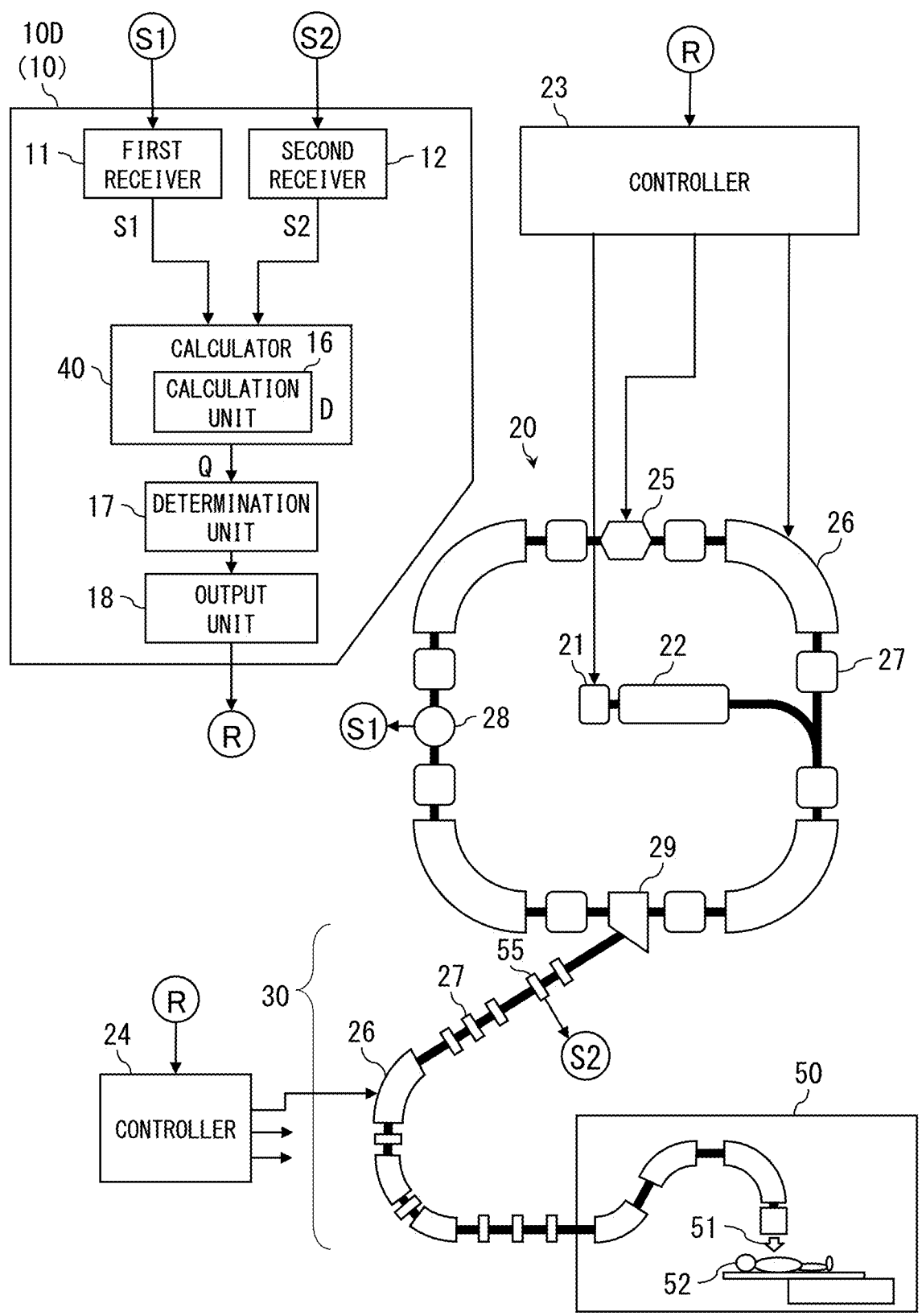
FIG. 5 is a block diagram of a diagnostic device for a particle accelerator according to the fourth embodiment of the present invention.

Next, the fourth embodiment of the present invention will be described by referring to FIG. 5. FIG. 5 is a block diagram of a diagnostic device 10D for a particle accelerator according to the fourth embodiment of the present invention. In FIG. 5, each component having the same configuration or function as those in FIG. 1 is denoted by the same reference sign, and duplicate description is omitted.

The diagnostic device 10D (10) for a particle accelerator according to the fourth embodiment further includes a determination unit 17 that determines whether or not to output an attention signal R of abnormality occurrence from an output unit 18 to at least one of the respective controllers 23 and 24 of the circular accelerator 20 and the beam transport system 30. This attention signal R is inputted to the controller 23 and causes the circular accelerator 20 and/or the beam transport system 30 to perform predetermined actions. The operation of the respective components of the fourth embodiment except the determination unit 17 and the output unit 18 is the same as the components of the first embodiment and the second embodiment.

When the extraction efficiency Q deteriorates beyond the permissible value, it is presumed that some abnormality has occurred in the circular accelerator 20 or the beam transport system 30. When the attention signal R is outputted in the process of treating a patient with the irradiator 50, in some cases, the operator is notified of it or the operation of the circular accelerator 20 and the beam transport system 30 is stopped urgently.

Additionally or alternatively, when the attention signal R is outputted, a plurality of correction current patterns are inputted to the electromagnets 27 by the controller 23 such that a plurality of extraction efficiencies Q are calculated on the basis of the respective correction current patterns. As a result, the charged particle beam can be efficiently radiated by adopting the correction current pattern having the best extraction efficiency Q.

Figure 6:
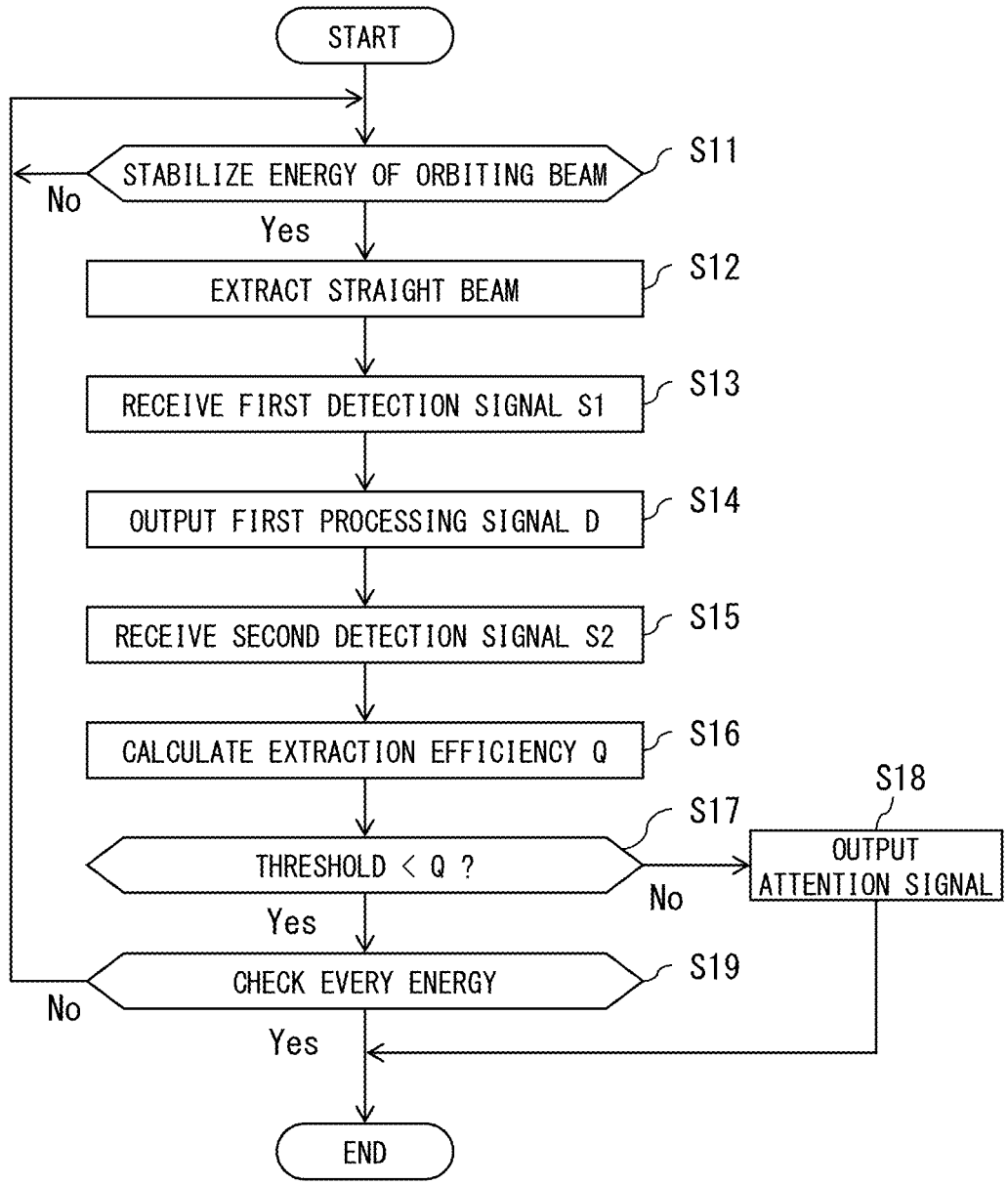
FIG. 6 is a flowchart illustrating a diagnostic method and a diagnostic program for a particle accelerator according to each embodiment.

A diagnostic method and a diagnostic program for a particle accelerator according to each embodiment will be described on the basis of the flowchart of FIG. 6 by referring to FIG. 1 as required.

First, in the step S11, the charged particle beam orbiting in the circular accelerator 20 is stabilized at a predetermined energy E.

In the next step S12, the charged particle beam is extracted from the circular accelerator 20 and is caused to pass straight through the beam transport system 30.

In the next step S13, the first detection signal S1 corresponding to the first current value, which is generated by the movement of charged particles orbiting in the circular accelerator 20, is received.

In the next step S14, the first detection signal S1 is time-differentiated and the first processing signal D is outputted.

In the step S15, the second detection signal S2 corresponding to the second current value generated by the movement of charged particles, which are extracted from the circular accelerator 20 and travel straight through the beam transport system 30, is received.

In the next step S16, the ratio between the first processing signal D and the second detection signal S2 is calculated, and the extraction efficiency Q of the charged particles is calculated.

If the extraction efficiency Q does not exceed a predetermined threshold value (No in the step S17), the attention signal is outputted in the step S18. If the attention signal is outputted, the exciting current to be inputted into the electromagnets constituting the circular accelerator 20 or the beam transport system 30 is adjusted at the operator's discretion.

If the extraction efficiency Q is larger than the threshold value (Yes in the step S17), the energy E of the charged particle beam orbiting in the circular accelerator 20 is updated (No in the step S19), and the flow from the steps S11 to S17 is repeated. If it is checked that the extraction efficiency Q is larger than the threshold value in all the energies E having been set (Yes in the step S19), the processing is completed.

According to the diagnostic device for a particle accelerator in at least one embodiment described above, the extraction efficiency of the charged particle beam can be evaluated in a short cycle by calculating the ratio between the temporal differential value of the beam current value of the circular accelerator and the beam current value of the beam transport system.

In each embodiment, it is sufficient if the decrease number of charged particles orbiting in the circular accelerator can be compared with the number of charged particles emitted into the beam transport system. Although the first detection signal is subjected to temporal differentiation in the above-described embodiments, the temporal differentiation is not an essential operation if it is configured such that the beam emission efficiency can be obtained on the basis of (i) change in first detection signal due to beam emission (i.e., decrease of charged particles in the circular accelerator) and (ii) the time corresponding to the emission timing of this beam (i.e., second detection signal at the timing when the emitted beam reaches the second detector 55), for example.

While certain embodiments have been described, these embodiments have been presented by way of example only, and are not intended to limit the scope of the inventions. These embodiments may be embodied in a variety of other forms, and various omissions, substitutions, and changes may be made without departing from the spirit of the inventions. These embodiments and their modifications are included in the accompanying claims and their equivalents as well as included in the scope and gist of the inventions.

The above-described diagnostic device for a particle accelerator includes: a controller in which one or more processors such as a dedicated chip, an FPGA (Field Programmable Gate Array), a GPU (Graphics Processing Unit), and a CPU (Central Processing Unit) are highly integrated; a memory such as a ROM (Read Only Memory) and a RAM (Random Access Memory); an external storage device such as a HDD (Hard Disk Drive) and an SSD (Solid State Drive); a display; an input device such as a mouse and a keyboard; and a communication interface. The diagnostic device for a particle accelerator can be realized by general computer-based hardware configuration.

The program to be executed by the diagnostic device for a particle accelerator may be provided in the form of being pre-embedded in a ROM or similar device. Additionally or alternatively, this program can be provided as an installable or executable file stored in a computer-readable storage medium such as a CD-ROM, a CD-R, a memory card, a DVD, and a flexible disk (FD).

Moreover, the program to be executed by the diagnostic device for a particle accelerator according to the present embodiment may be stored in a computer connected to a network such as the Internet so as to be provided by being downloaded via the network. Furthermore, the diagnostic device for a particle accelerator can also be configured by interconnecting separate modules, which independently achieve the respective functions of the components, via a network or dedicated lines and combining these modules.

The invention claimed is:

1. A diagnostic device for a particle accelerator, the particle accelerator comprising a circular accelerator connected to a beam transport system via an emission device, the diagnostic device comprising:
   a first receiver configured to receive a first detection signal from a first detector attached to the circular accelerator and configured to detect a first current value generated by movement of first charged particles circulating in the circular accelerator, the first detection signal being outputted as a signal corresponding to the first current value;
   a second receiver configured to receive a second detection signal from at least one second detector attached to the beam transport system to detect a second current value generated by movement of second charged particles, which are extracted from the first charged particles circulating in the circular accelerator to propagate into the beam transport system, the second detection signal being outputted as a signal corresponding to the second current value; and
   a processor configured to acquire a first processing signal by performing processing comprising a differentiation on the first detection signal and to thereby calculate an extraction efficiency of the second charged particles from the first charged particles based on a ratio between the first processing signal and the second detection signal.

2. The diagnostic device for a particle accelerator according to claim 1, wherein the processor is further configured to:
   convert the first processing signal into a first conversion value by multiplying the first processing signal by a first coefficient, the first conversion value representing a decreased number of the first charged particles orbiting in the circular accelerator per unit time; and convert the second detection signal into a second conversion value by multiplying the second detection signal by a second coefficient, the second conversion value representing a passing number of the second charged particles travelling straight through the beam transport system per unit time; and calculate the extraction efficiency by dividing the second conversion value by the first conversion value.

3. The diagnostic device for a particle accelerator according to claim 1, wherein the processor is configured to calculate the extraction efficiency for each time energy of the first charged particles orbiting in the circular accelerator to change in a stepwise manner.

4. The diagnostic device for a particle accelerator according to claim 1, wherein the at least one second detector comprises a plurality of second detectors provided in the beam transport system, and wherein the processor is further configured to select any one of respective second detection signals received from the plurality of second detectors.

5. The diagnostic device for a particle accelerator according to claim 1, wherein the processor is configured to determine whether to output an abnormality-occurrence attention-signal to a controller of at least one of the circular accelerator and the beam transport system or not, based on the extraction efficiency.

6. The diagnostic device for a particle accelerator according to claim 5, wherein the controller is configured to input a plurality of correction current patterns into an electromagnet of the circular accelerator and to calculate a plurality of extraction efficiencies based on respective correction current patterns, when outputting the abnormality-occurrence attention-signal.

7. A diagnostic method for a particle accelerator, the particle accelerator comprising a circular accelerator connected to a beam transport system via an emission device, the method comprising steps of:

receiving a first detection signal from a first detector attached to the circular accelerator to detect a first current value generated by movement of first charged particles circulating in the circular accelerator, the first detection signal being outputted as a signal corresponding to the first current value;

receiving a second detection signal from a second detector attached to the circular accelerator to detect a second current value generated by movement of second charged particles, which are extracted from the first charged particles circulating in the circular accelerator to propagate into the beam transport system, the second detection signal being outputted as a signal corresponding to the second current value;

acquiring a first processing signal by performing processing comprising a differentiation on the first detection signal; and calculating an extraction efficiency of the second charged particles from the first charged particles based on a ratio between the first processing signal and the second detection signal.

8. A non-transitory computer-readable storage medium with an executable diagnostic program stored thereon, with respect to a particle accelerator comprising a circular accelerator connected to a beam transport system via an emission device, wherein the diagnostic program instructs a processor to execute the steps of:

receiving a first detection signal from a first detector attached to the circular accelerator to detect a first current value generated by movement of first charged particles circulating in the circular accelerator, the first detection signal being outputted as a signal corresponding to the first current value;

receiving a second detection signal from a second detector attached to the beam transport system to detect a second current value generated by movement of second charged particles, which are extracted from the first charged particles circulating in the circular accelerator to propagate into the beam transport system, the second detection signal being outputted as a signal corresponding to the second current value;

acquiring a first processing signal by performing processing comprising a differentiation on the first detection signal; and calculating an extraction efficiency of the second charged particles from the first charged particles based on a ratio between the first processing signal and the second detection signal.

* * * * *